United States Patent [19]

Stowe

[11] Patent Number: 5,231,954
[45] Date of Patent: Aug. 3, 1993

[54] HYDROGEN/OXYGEN FUEL CELL

[75] Inventor: Gene B. Stowe, Mesa, Ariz.

[73] Assignee: J. C. Conner, Scottsdale, Ariz.; a part interest

[21] Appl. No.: 926,039

[22] Filed: Aug. 5, 1992

[51] Int. Cl.$^5$ .............................................. F02B 43/08
[52] U.S. Cl. ............................... 123/3; 123/DIG. 12; 204/278
[58] Field of Search .................. 123/3, DIG. 12, 1 A; 204/DIG. 4, 272, 278

[56] References Cited

U.S. PATENT DOCUMENTS

| | | | |
|---|---|---|---|
| 1,262,034 | 4/1918 | Frazer | 123/DIG. 12 |
| 3,311,097 | 3/1967 | Mittelstaedt | 123/119 |
| 3,410,770 | 11/1968 | Buechler | 204/129 |
| 3,648,668 | 3/1972 | Pacheco | 123/3 |
| 3,910,831 | 10/1975 | Helart | 204/278 |
| 3,917,520 | 11/1975 | Katz et al. | 204/129 |
| 3,933,614 | 1/1976 | Bunn | 204/266 |
| 3,939,806 | 2/1976 | Bradley | 123/3 |
| 4,014,777 | 3/1977 | Brown | 204/270 |
| 4,031,865 | 6/1977 | Dufour | 123/1 |
| 4,124,463 | 11/1978 | Blue | 204/129 |
| 4,263,112 | 4/1981 | Frosch | 203/129 |
| 4,389,981 | 6/1983 | Meyer | 123/3 |
| 4,442,801 | 4/1984 | Glynn et al. | 123/3 |
| 4,457,816 | 7/1984 | Galluzzo et al. | 204/105 |
| 4,747,925 | 5/1988 | Hasebe | 204/270 |
| 4,923,768 | 5/1990 | Kaneko et al. | 429/19 |
| 4,964,524 | 10/1990 | Haleme | 220/3 |
| 5,037,518 | 8/1991 | Young et al. | 204/230 |

OTHER PUBLICATIONS

Dahiya, Progress in Hydrogen Energy, D. Reidel Publishing Co. (1987), pp. 15-29.
Graham & Trotman, Hydrogen: Energy Vector of the Future, (Mar. 24-25, 1981), pp. 55-67.
Casper, Hydrogen Manufacture by Electrolysis, Thermal Decomposition and Unusual Techniques, Noyes Data Corp., (1978) pp. 111-207.
Peavey, Fuel from Water, Merit Products, Inc., pp. 15-50.
Kirk-Othmer, Encyclopedia of Chemical Technology, 3rd Edition, vol. 8, pp. 673-674, 679.
Kirk-Othmer, Encyclopedia of Chemical Technology, 3rd Edition, vol. 3, pp. 562-568, 960-982.

Primary Examiner—E. Rollins Cross
Assistant Examiner—E. Solis
Attorney, Agent, or Firm—Charles E. Cates; Frank T. Barber

[57] ABSTRACT

An electrolysis cell is provided for use in connection with a combustion engine, for generating hydrogen and oxygen gases which are added to the fuel delivery system as a supplement to the gasoline or other hydrocarbons burned therein. The hazard of explosion of the mixture of generated gases is eliminated by withdrawing the gases through a connection with the vacuum line of the positive crankcase ventilation (PCV) system of the engine and by utilizing a slip-fitted top cap for the electrolysis cell, which cooperates with the PCV vacuum line to prevent explosive containment of generated gases in case of accident. Use of the generated gases as a fuel supplement enables substantial increases in fuel efficiency, while at the same time reducing the emission of pollutants.

7 Claims, 1 Drawing Sheet

HYDROGEN/OXYGEN FUEL CELL

BACKGROUND OF THE INVENTION

This invention relates generally to the production of hydrogen and oxygen in a closed electrolytic chamber, filled with an aqueous electrolyte solution, and working with electrodes connected to a source of electrical potential. The invention is useful in automobiles, trucks, stationary engines, tractors, industrial plants, trains, ships, airplanes, generating plants, and all other places where fossil fuel is burned as a source of energy. The invention will be described herein with specific reference to its use in an automobile engine.

At the present time there are two major problems facing the nation with respect to the operation of the millions of automobiles, trucks, buses, and the like which are currently in use. One of these problems is the pollution of the atmosphere caused by the noxious gases generated as by-products of combustion in the engines of these vehicles. A few of these are defined as carbon monoxide (CO), nitrous oxide ($NO_x$), unburned hydrocarbons (HC), sulfur dioxide ($SO_2$), and so on. During the past 20 years, considerable effort and expense have been devoted to resolving this ever growing problem.

The second problem deals with an increasing shortage of the fossil fuels on which vehicles operate, and a very substantial amount of work has been done with the objective of increasing the efficiency of existing engines so as to use less fuel, as well as searching for alternative sources of energy for the vehicles.

It has been recognized for some time that hydrogen as a fuel has numerous advantages over fossil fuels. In burning, it releases heat energy almost three times greater than any other fuel. It burns clean, producing only water as residue. It can be made from water almost any place on earth by several processes, one of the most convenient being by electrolysis of water. However, the 100% substitution of hydrogen for gasoline or other fossil fuels in vehicle engines presents practical problems which have delayed commercial acceptance. A hydrogen tank is an explosion hazard. Also, the energy required to convert water to hydrogen in itself requires the burning of fossil or other fuels, with accompanying reduction in existing fuel supplies and accompanying increase in pollution or other hazards.

As an extension of the above concept, there has been additional research in the prior art to evaluate the practical utility of hydrogen as a fuel supplement in existing systems. It has been found that when hydrogen is mixed with gasoline and air in the combustion chamber of a conventional vehicle engine, there is an improved combustion. The result is substantially improved thermal efficiency and a marked reduction of noxious emissions.

However, to provide a tank of hydrogen adjacent the engine to supplement the gasoline supply presents the same difficulties as involved with hydrogen as a primary fuel, except of course on a smaller scale. Therefore, over the past decades there has been additional work on the concept of providing an electrolysis chamber under the hood of the vehicle, adjacent the engine, for providing hydrogen on an as needed basis, and using electrical energy from the battery and electrical system of the vehicle to perform the electrolysis. While this work has confirmed certain theoretical advantages of hydrogen supplementation, it has not yielded a practical, workable system, since the technology has been known for some time but has not come into common use.

The lack of public acceptance has been due to the fact that the systems proposed in the past have been characterized by excessively heavy and oversized units, the use of high pressure, the need for heating, cooling, fanning, purging, or filtering, the use of heavy cabling and precious metal electrodes, and the need for extensive modifications of the existing vehicle engine. Even more important, there has been the safety hazard presented by the potential for explosion of accumulated gases in the event of unusual occurrences, such as collision of the vehicle or inadvertent turning off of the engine while the generation of hydrogen and oxygen still continues.

It is an object of the present invention to provide a new and improved hydrogen supplementation system which overcomes or minimizes the above-mentioned disadvantages of previously known systems.

More specifically, it is an object to utilize the existing source of electrical potential in the engine to decompose water to provide hydrogen and oxygen which is used in the engine, thereby greatly reducing air pollution and increasing fuel efficiency.

It is a further object of the invention to provide a system which is inexpensive, readily installed and maintained, without modification of the existing engine, and which includes simple mechanisms for eliminating the hazard of explosion.

Other objects and advantages will become apparent as this specification proceeds.

SUMMARY OF THE INVENTION

The present invention relates to a hydrogen supplementation system for an engine, comprising an electrolysis chamber located adjacent said engine, said chamber having a securely bonded bottom and a friction-fitted top cap, removable by internal ga pressure; an aqueous electrolyte solution partially filling the chamber and leaving a gas accumulation zone in the chamber above the electrolyte level; a pair of electrodes disposed within the chamber and at least partially immersed in the electrolyte solution, said electrodes being electrically connected to opposite sides of the battery or other source of electrical potential in said engine, whereby hydrogen and oxygen are generated from the water in said electrolyte; and a hydrogen/oxygen delivery line connected at one end to the gas accumulation zone in the electrolysis chamber and at the other end to the vacuum line in the positive crankcase ventilation (PCV) system of the engine, whereby hydrogen and oxygen generated in the electrolysis chamber are withdrawn immediately by the vacuum effect in the PCV vacuum line and fed into the intake air manifold of the engine.

The apparatus of the invention is extremely simple and has no moving parts. It is made of inexpensive, readily available materials. It is installed merely by attaching the electrode wires to opposite poles of the battery and installing a T-joint in the PCV vacuum line of the engine. No modification of the engine is required.

Further, it incorporates the unique feature of a friction-fitted top cap for the electrolysis chamber, which provides automatic secure containment during normal operation of the engine, but provides pressure release under abnormal conditions. Thus, during normal operation, the negative pressure in the PCV vacuum line pulls the top cap down securely on the electrolysis chamber, thus preventing escape of generated gases. However, in unusual situations where the engine may stop but the generation of hydrogen and oxygen continues, the cessation of the vacuum effect in the PCV line loosens the top cap so that it will pop off if there is a build-up of gas pressure in the electrolysis chamber, thereby eliminating the confinement necessary for explosion. This feature, together with the special combination of electrolyte components to be discussed hereinafter, eliminates the explosion hazard which hampered past efforts.

Addition of hydrogen and oxygen to the fuel supply of the engine by use of the present invention enables a substantial improvement in fuel efficiency and mileage per gallon, as well as a striking reduction in noxious gases emitting from the engine.

BRIEF DESCRIPTION OF THE DRAWINGS

In order that the invention may be better understood, a description of the invention is provided herein with reference to the general concepts and an illustrative embodiment thereof, wherein:

FIG. 3 is an exploded perspective side view of the electrolysis device, showing top and bottom caps separated from the main body, and indicating the location of electrodes, gas accumulation zone, gas delivery line, and the like.

DESCRIPTION OF THE PREFERRED EMBODIMENT

Figure 1:
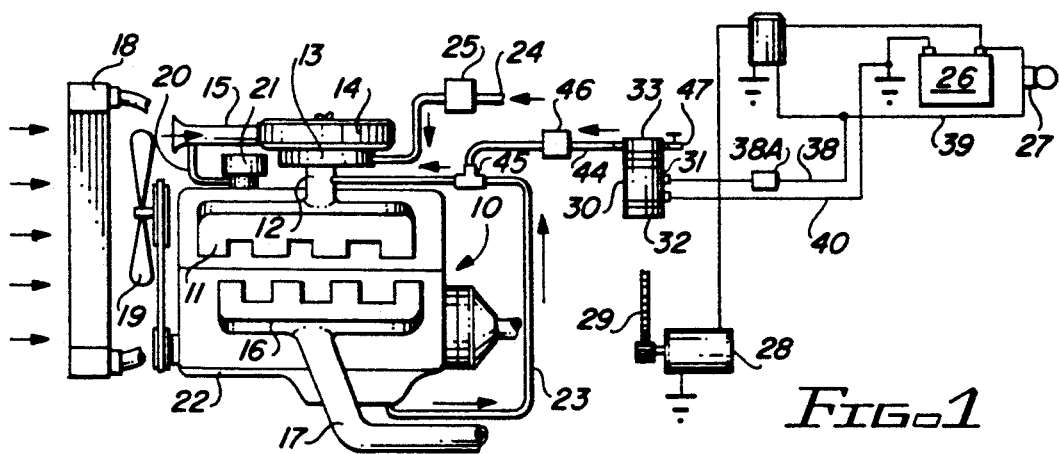
FIG. 1 is a diagrammatic view of an automobile engine, showing incorporation of the electrolysis device of the present invention.

Referring now to the drawings, wherein like reference characters denote corresponding elements throughout the several views, and first to FIG. 1, an internal combustion engine of the piston type in which fuel is ignited by spark plugs is shown as including an engine block represented at 10. Mounted on engine block 10 is a fuel intake manifold 11 having a main stem 12 on which is mounted a carburetor 13 for hydrocarbon fuel such as gasoline. Mounted above carburetor 13 is an air filter 14 having an air intake 15.

Carried by engine block 10 is an exhaust manifold 16 from which extends an exhaust pipe 17. Engine block 10 includes a cooling system in accordance with accepted practice and hence is not illustrated here. However, a radiator and a fan which may be considered as part of a cooling system are illustrated at 18 and 19 respectively.

The engine includes a positive crankcase ventilation (PCV) system, in which a source of air is drawn from the air intake 15 through a tube 20 into the oil filler cap assembly 21, from where the air flows past rocker arms and pushrods (not shown) into the crankcase 22. The air and accumulated crankcase gases then enter a spring-loaded regulator valve (PCV valve, not shown), from where the air and gas mixture is routed from the crankcase 22 through a crankcase vent hose tube 23 to the main stem 12 of the intake manifold 11, from where the crankcase gases may be burned with the incoming fuel and air mixture. The crankcase vent hose tube 23 is a vacuum tube and creates a negative pressure on the system continuously while the engine is running.

The engine includes an associated fuel tank (not shown) from which gasoline or other fuel is drawn through line 24 by fuel pump 25 and introduced into the carburetor 13.

The engine also includes a battery 26 as a source of electrical potential, together with associated wiring and switching. An ignition key switch 27 is adapted to supply energy from the battery 26 to the cranking motor 28 to activate the flywheel 29 to turn over the engine upon starting the vehicle.

Figure 2:
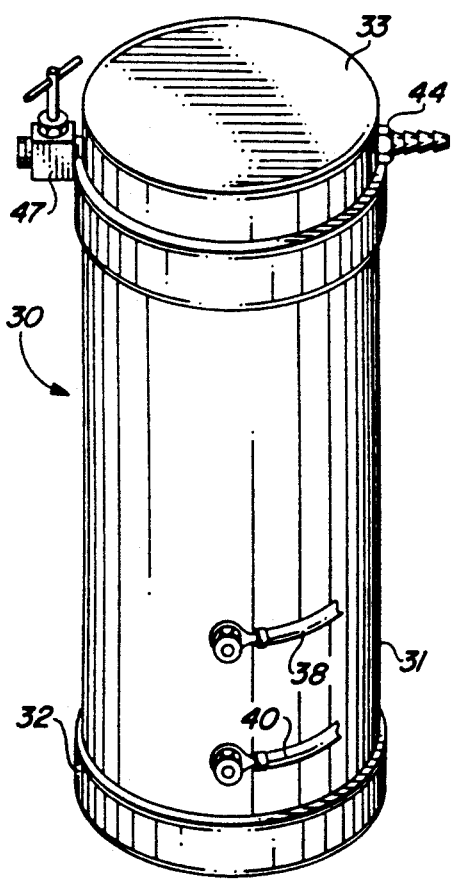
FIG. 2 is a perspective view of the electrolysis device of the invention.
Figure 3:
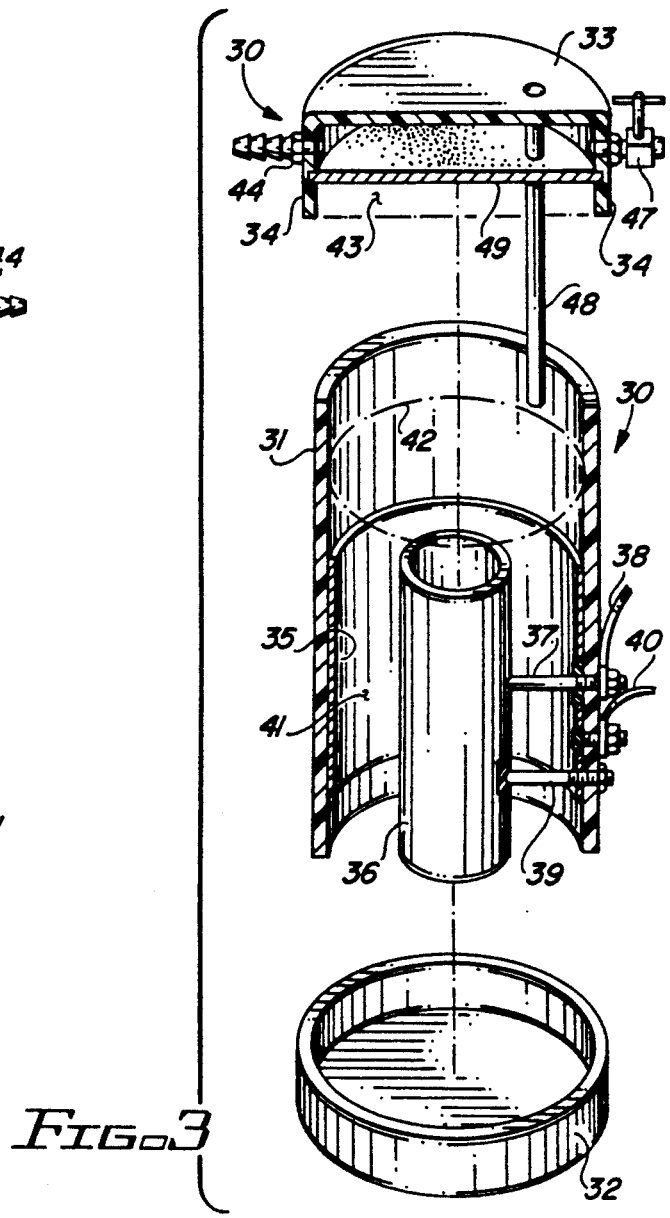

An important feature of the invention is an electrolysis canister or chamber 30, which is shown in the diagram of FIG. 1 and in greater detail in FIGS. 2 and 3. The chamber 30 illustrated in the drawings is formed as a waterproof cylindrical casing 31, made of a chemically and electrically inert material, such as high impact plastic, tempered glass, glazed lava, or the like. Chamber 30 is not restricted to a cylindrical shape, but may have any suitable configuration, including square, rectangular, or customfitted, depending upon its location adjacent the engine block 10. As shown in the drawings, casing 31 has a bottom cap 32 which is permanently and securely adhered to the casing body, and a top cap 33 which is slip-fitted on the casing 31 and held there by friction. To assist in maintaining a seal in the slip-fitting, an O-ring seal 34 is built into the side of the top cap.

Located within the casing 31 are a cylindrical stainless steel cathode 35, which may be formed as an inner liner for the casing 31, and a cylindrical stainless steel core anode 36, which is secured concentrically of the cathode cylinder 35. The anode 36 is supported by a pair of stainless steel bolts 37 and 39 which are secured to the casing 31. Bolt 37 is insulated from contact with cathode 35 but is electrically connected to anode 36 at one end and to electrical wire 38 at the other end. Wire 38 runs through a fuse box 38A and then connects with wire 39, which leads through ignition key switch 27 and connects with the positive pole of battery 26. Bolt 39 is insulated from electrical contact with both cathode 35 and anode 36, and acts merely as a second support member for holding anode 36 in place. A second wire 40 is in electrical contact with cathode 35 and leads to the negative ground pole of the battery 26, or vehicle frame, if grounded.

As shown in FIG. 3, the electrolysis chamber contains an aqueous electrolyte solution 41, which is normally filled to a level 42 above the top of cathode 35 and anode 36. When current is applied and passes through the electrolyte solution between the electrodes 35 and 36, the water in the solution is decomposed to produce hydrogen and oxygen gas, which rises upwardly above the electrolyte level 42 and collects in a gas accumulation zone 43. Hydrogen and oxygen which reach the gas accumulation zone are instantly drawn off through a gas outlet line 44, connected to an opening in top cap 33. The line 44 is connected at the other end to the crankcase vacuum hose 23 of the engine, through a T-joint 45, and accordingly the hydrogen and oxygen gases generated in the electrolysis chamber 30 are conducted into the main stem 12 and into the intake manifold 11 of the engine. A backflash arrestor valve 46 is located in line 44 to prevent accidental explosion of hydrogen and oxygen gases in the event of engine backfire.

The top ca 33 of the electrolysis chamber 30 is fitted with an intake air adjustment valve 47, which permits emission control mechanics to mix air with the accumulated hydrogen and oxygen gases in such proportions as may be needed to conform to existing emission control regulations, as applied to the particular type and size of engine. An optional air cooling tube 48 extends from the top cap 33 and terminates at a point below the surface 42 of the aqueous electrolyte solution 41, allowing, if desired, an additional supply of air to be drawn into the solution and to assist in liberation of hydrogen and oxygen gas bubbles from the electrodes. The top cap 33 is also fitted with a thick fiber splash guard membrane 49 to prevent liquid electrolyte from entering the gas outlet line 44, while at the same time permitting the generated gases to pass through it.

The size of the canister or electrolysis chamber 30 may vary according to the size of the engine to which it is attached. For smaller cars having a four cylinder engine, the recommended size of the canister is about 3½ inches in diameter, with a height of about 8 to 12 inches. For six cylinder cars, an appropriate size is about 4½ by 10–12 inches; and for eight cylinder cars and trucks, the size is in the range of about 6½ by 10–12 inches. Diesel trucks, stationary engines, motorhomes, tractors, boats and large electrical generators can use an 8½ by 24–36 inch size, mounted either vertically or horizontally.

In order for current to be passed between the electrodes 35 and 36, it is necessary that the solution filling the electrolysis chamber be something other than distilled water. For the purposes of the present invention, it is sufficient that a small amount of electrolyte be present in the water. For example, an electrolyte solution can be made by mixing small quantities of phosphoric acid (food grade), sodium perborate (to supply extra oxygen), and acetanilide as a stabilizer, in deionized or distilled water. The quantities of these chemicals may be varied between rather wide ranges, the objective being to provide reasonable flow of current between the two electrodes. Preferably, the above electrolyte solution in the electrolysis chamber comprises between about 0.05 to 0.1% of the total solution in the chamber, although lesser greater amounts may be used with some decrease in effectiveness. An illustrative example showing preparation of a suitable electrolyte concentrate is given in Example 1, following later in this specification.

The procedure for initial installation of the electrolyte solution in the electrolysis chamber comprises filling distilled or deionized water to the liquid level 42 above the top edges of the electrodes 35 and 36, and then adding electrolyte concentrate with a syringe or dropper until a reading of 1.5 amperes is obtained with the engine running. Usually, this amperage may be obtained by using 1 to 1.5 ounces of concentrate (prepared as in Example 1) per liter of distilled or deionized water in the chamber. If the vehicle is intended for long trips or hard usage, the initial addition of electrolyte concentrate may be increased to obtain a greater amperage reading, preferably in the range up to 3.0.

After the initial installation of the electrolyte solution, as above, it is only necessary to add distilled water on an occasional basis to maintain the unit in operation. Under normal usage, this involves adding distilled about every 30 days or one thousand miles of driving. Adding the water may be accomplished by removing the slip-fitted top cap 33 and pouring in the water to fill up to the top level line 42. The initial charge of electrolyte will last for about one year, or about 10,000 miles of driving, under normal conditions.

As demonstrated above, the electrolysis unit of the present invention is inexpensive and simple to install and maintain in existing engines. It has no moving parts. It has two wires leading to the battery, and a single hose connection installed in the PCV vacuum line by a simple T-joint connection. Electrical current to the system is actuated by turning the ignition switch key to start the engine. Hydrogen and oxygen are generated as long as the engine is running. When the key is turned to the off position, the motor stops, and so does the generating of hydrogen and oxygen gases.

Although simple and inexpensive in structure, the system of the present invention effectively avoids the explosion hazard which overshadowed the use of prior devices. An important element in achieving this is the feature of using a friction-fit top cap 33 in combination with use of the vacuum tube of the PCV system. When the engine is running, the top cap is pulled down tightly on the canister by the negative pressure in the PCV vacuum line 23, and generated gases cannot escape but rather are drawn directly into the engine intake manifold where they are immediately burned with the standard fuel mixture. When the engine stops, the top cap 33 is no longer under negative pressure and is easily removed. Therefore, in the event of abnormal conditions, where the engine might be stopped, but the ignition key not turned off (as in the case of accident or repair work on the electrical system), the continued generation of hydrogen and oxygen gases without being consumed in the engine will not cause a dangerous build-up of gases in the canister, because the top cap 33 will readily pop off, thus eliminating the confinement condition that is necessary for an explosion. Added to this safety factor is the air adjustment valve 47 which is always in an open position on cap 33 and therefore acts as a safety relief valve under the abnormal conditions described above. An even further safety feature is contributed by the constitution of the electrolyte solution, which has been found to generate other substances which decompose at a uniform rate and condition the released hydrogen and oxygen gases against explosion but do not interfere with the high heat energy of the hydrogen gas.

Use of the electrolysis unit of the present invention effectively addresses the major problems currently facing the nation with respect to the operation of fossil fuel powered vehicles. The high heat energy of the mixture of conditioned hydrogen and oxygen gases generated in this unit, when added as a supplement to other hydrocarbon fuels, causes the unburned portions of that fuel to burn completely, thereby effecting a striking reduction in the concentration of noxious gases in the emissions. Further, a substantial improvement in gas mileage is obtained, thereby contributing substantially to the solution of the fuel shortage problem, and since less fuel is used overall, even less pollution is added to the atmosphere. Tests showing the improvement in mileage and pollution reduction are described in Examples 2 and 3, set out later in this specification.

The following examples illustrate certain specific embodiments of the invention. It will be understood that the invention is not limited to the specific materials or proportions given, but comprehends all such modifications and variations thereof as will be apparent to those skilled in the art.

EXAMPLE 1

An electrolyte concentrate solution was prepared for use in the invention, utilizing the following components:

| Component | Quantity |
| --- | --- |
| Distilled or deionized water | 3,000 mls |
| Phosphoric acid (food grade) | 500 gm |

-continued

| Component | Quantity |
|---|---|
| Sodium perborate | 100 gm |
| Acetanilide | 10 gm |

The mixture was agitated until all chemicals had dissolved.

The above solution was diluted with deionized distilled water to 3 gallons and then poured into an electrolyte cell and charged at 150–200 amps for 24 hours. The solution was then removed and filtered through diatomaceous earth, and stored as required. Usually one ounce of this concentrate per liter of distilled water produces electrolyte have a pH of 5 and is sufficient to produce 1 amp at 12 volts, when used in the electrolysis unit of the present invention.

EXAMPLE 2

The following mileage tests were conducted using a 1987 GMC ¾ Ton Truck with 350 cu. in. engine. In the first series of tests, the mileage was measured before the electrolysis system of the present invention was installed. The second series of tests were made after installation of an 8"×10" electrolysis canister and associated equipment of the present invention.

| DATE | ODOM | MILES | GALS | MPG | % CHANGE |
|---|---|---|---|---|---|
| | | First Series | | | |
| 12/03/91 | 80520 | 160 | 16.0 | 10.0 | |
| 12/10/91 | 80680 | 150 | 14.5 | 10.34 | |
| 12/12/91 | 80830 | 140 | 16.9 | 8.28 | |
| 12/18/91 | 80970 | 178 | 17.2 | 10.35 | |
| 12/19/91 | 81148 | 80 | 10.1 | 9.92 | |
| 12/27/91 | 81228 | 172 | 15.9 | 10.81 | |
| 12/20/91 | 81550 | 150 | 14.2 | 10.56 | |
| | | 1030 | 104.8 | 9.83 MPG | |
| 01/03/92 | 81708 | 158 | 15.6 | 10.12 | |
| 01/10/92 | 81840 | 132 | 15.5 | 8.51 | |
| 01/15/92 | 82000 | 160 | 16.0 | 10.00 | |
| 01/17/92 | 82143 | 143 | 15.7 | 9.12 | |
| 01/21/92 | 82290 | 147 | 15.4 | 9.54 | |
| 01/27/92 | 82425 | 135 | 13.1 | 10.30 | |
| 02/05/92 | 82551 | 126 | 15.1 | 8.34 | |
| | | 834 | 90.0 | 9.27 MPG | |
| | | 1873 | 195.7 | 9.57 MPG | |
| | | Second Series | | | |
| 03/10/92 | 82712 | | | INSTALLED ELECTROLYSIS CELL | |
| 03/11/92 | 82888 | 176 | 15.7 | 11.21 | |
| 03/13/92 | 83062 | 174 | 15.1 | 11.52 | |
| 03/13/92 | 83266 | 204 | 16.6 | 12.29 | |
| 03/18/92 | 83416 | 150 | 12.7 | 11.81 | |
| 03/18/92 | 83513 | 97 | 8.1 | 11.97 | |
| | | 801 | 68.2 | 11.75 MPG | +22.8% |
| 03/23/92 | 83672–83995 | 323 | 25 | 12.9 MPG | +34.8%* |
| 03/27/92 | 84119–84264 | 145 | 11.3 | 12.83 MPG | +34.0% |
| 03/27/92 | 84264- | 171 | 14.4 | 11.88 MPG | +24.1%* |

*Adjusted Electrolysis Cell Supply Valve
**Strong head wind

EXAMPLE 3

The following pollution tests were conducted using a 1987 GMC ¾ Ton Truck with 350 cu. in. engine, having in excess of 80,000 miles on the odometer. The electrolysis unit of the present invention is referred to in the comments column as an "ECA Cell". It measured 8"×10".

| DATE | RPM | HC PPM | CO % | $O_2$ % | COMMENTS |
|---|---|---|---|---|---|
| 3/13/92 | 765 | 132 | 1.52 | 0.2 | Running on unleaded gas, with ECA Cell not installed |
| 3/13/92 | 785 | 74 | 0.33 | 0.2 | Running on ECA Cell and gas, 12V .3A (1 vac line to PVC) |
| 3/18/92 | 707 | 41 | 0.04 | 5.0 | Running on ECA Cell and gas, 25V 1.8A (1 vac line to PVC) |
| 3/13/92 | 2549 | 79 | 1.17 | 0.5 | Running on unleaded gas, with ECA Cell not installed |
| 3/13/92 | 2662 | 60 | 1.06 | 0.5 | Running on ECA Cell and gas, 12V .3A (1 vac line to PCV) |
| 3/18/92 | 2366 | 84 | 0.95 | 0.07 | Running on ECA Cell and gas, 25V 1.8A (2 vac lines, 1 to PCV, 1 to brakes) 3 turns on valve |
| 3/18/92 | 2520 | 71 | 0.81 | 0.07 | Running on ECA Cell and gas, 25V 1.8A (1 vac line to PCV) 3 turns on valve |
| 3/18/92 | 2530 | 81 | 0.88 | 0.4 | Running on ECA Cell and gas, 20V 1.5A (1 vac line to PCV) 1 turn on valve |
| 3/18/92 | 2780 | 57 | 0.96 | 0.3 | Running on ECA Cell and gas, 20V 1.5A (1 vac line to PCV) 1 turn on valve |

The device of the present invention provides the following features which are significantly advantageous in terms of simplicity and safety of the device and effectiveness in the field of fuel consumption reduction and emission control:

1. The device is extremely simple and inexpensive in design. It has no moving parts. To install on an existing gasoline engine requires only attaching the two electrical wires to the battery and the outlet hose to the PCV vacuum line of the engine. The installation takes less than 30 minutes, and no modifications are made to the engine.

2. In spite of its simplicity, the device is extremely safe. There is no need for storing explosive hydrogen. It is generated on an as-needed basis. The unique combination of a slip-fitted top cap attached to the vacuum line of the PCV system provides constant removal of hydrogen from the electrolysis cell, while at the same time ensuring that, in the event of accident, no hydrogen is confined in an explosive state. Other factors, such as the release valve role played by the air inlet valve, and the anti-explosion conditioning contributed by the particular electrolytes utilized, contribute to the safety of the device.

3. In use of the device, the only consumable is water (and minute quantities of inexpensive electrolytes). No fossil fuel or other pollutant-causing sources of energy must be used to provide the electricity for electrolysis of the water into hydrogen and oxygen. The electricity is generated on site in the vehicle by operation of the engine.

4. The friction-fitted top cap of the electrolysis chamber provides a number of advantages. Although loosely fitting, it is drawn down into a tight-fitting position by the negative pressure in the PCV vacuum line in normal operation of the engine, but when the engine stops the top cap becomes loose again, thereby being easily popped off in the event an unwanted accumulation of gases occurs in the electrolysis chamber. Also, the removable feature of the top cap provides ready access for inspection of the interior of the electrolysis chamber, or for adding make up water or electrolyte.

5. When used as a supplement to the hydrocarbon fuel, the mixture of conditioned hydrogen and oxygen, because of its high heat energy, causes the hydrocarbon to burn more completely, thereby greatly reducing hydrocarbon emission while developing more horsepower, increasing miles per gallon, and contributing overall to a greater fuel economy. The improvement of gasoline mileage contributes substantially to solution of the fuel shortage problem, and since less fuel is used overall, a second advantage is that less pollution is added to the atmosphere.

6. Burning the conditioned mixture of hydrogen and oxygen gases produces high temperature steam. Accordingly the exhaust gases from the engine are steam cleaned and have substantially lower concentrations of combustible particles, thereby contributing even further to solution of the pollution problem.

Although the present invention has been disclosed in connection with certain preferred embodiments thereof, variations and modifications may be made by those skilled in the art without departing from the principles of the invention. All of these variations and modifications are considered to be within the true spirit and scope of the present invention as disclosed in the foregoing description and defined by the claims.

What is claimed is:

1. In a combustion engine including combustion chambers; associated pistons, crankshaft and crankcase; a hydrocarbon fuel tank; fuel delivery means for mixing said fuel with air and delivering said fuel/air mixture through an intake manifold to said combustion chamber; a vacuum line for circulating crankcase gases from said crankcase to said intake manifold; and a source of electrical potential energized by the operation of said engine; the improvement to said engine comprising:
    an electrolysis chamber having a securely bonded bottom and a friction-fitted to cap said friction fitted top cap being, removable by internal gas pressure for the prevention of explosion concentrations of gas;
    an aqueous electrolyte solution partially filling said electrolysis chamber and leaving a gas accumulation zone thereabove in said electrolysis chamber;
    a pair of electrodes disposed within said electrolysis chamber and at least partially immersed in said electrolyte solution, said electrodes being electrically connected to opposite sides of said source of electrical potential, whereby hydrogen and oxygen are generated from the water in said electrolyte solution and are collected in said gas accumulation zone; and
    a hydrogen/oxygen delivery line connected at one end to said gas accumulation zone in said electrolysis chamber and at the other end to said vacuum line for circulating crankcase gases to said intake manifold, whereby hydrogen and oxygen generated in said electrolysis chamber are withdrawn by the vacuum effect in said vacuum line and fed into said intake manifold.

2. The apparatus of claim 1 wherein said gas accumulation zone is in communication with the atmosphere through an air intake line having an air adjustment valve.

3. The apparatus of claim 1 wherein one of said electrodes is connected to said source of electrical potential through an ignition key switch.

4. The apparatus of claim 1 wherein said electrodes are a pair of concentric cylinders.

5. The apparatus of claim 1 wherein said electrolyte solution in said electrolysis chamber constitutes from 0.05% to 0.1% of the total solution in said chamber.

6. The apparatus of claim 1 wherein said electrolyte solution in said electrolysis chamber comprises a solution of water, phosphoric acid, sodium perborate, and acetanilide.

7. In a combustion engine including combustion cylinders; associated pistons, crankshaft and crankcase; a hydrocarbon fuel tank; fuel delivery means for mixing said fuel with air and delivering said fuel/air mixture through an intake manifold to said combustion chamber; a vacuum line for circulating crankcase gases from said crankcase to said intake manifold; and a battery energized by the operation of said engine; the improvement to said engine comprising:
    an electrolysis chamber having a securely bonded bottom cap, and a top cap held in place on said chamber by an O-ring seal, said top cap being displaceable by internal gas pressure for the prevention of explosive concentrations of gas;
    an aqueous electrolyte solution partially filling said electrolysis chamber and leaving a gas accumulation zone thereabove in said electrolysis chamber, said electrolyte solution comprising water, phosphoric acid, sodium perborate, and acetanilide;
    an inner stainless steel cylindrical electrode and an outer stainless steel cylindrical electrode concentrically disposed with respect to each other within said electrolysis chamber and at least partially immersed in said electrolyte solution, the said inner electrode being electrically connected to the positive side of said battery through an ignition key switch, and the said outer electrode being connected to the negative side of said battery, whereby when said ignition key switch is turn to an on position, hydrogen and oxygen are generated from said electrolyte solution and are collected in said gas accumulation zone; and
    an air intake opening in said top cap, for introduction of atmospheric air into said gas accumulation zone, the size of said opening being controlled by an air adjustment valve;
    a hydrogen/oxygen delivery line connected at one end through said top cap into said gas accumulation zone in said electrolysis chamber and connected at the other end to said vacuum line for circulating crankcase gases to said intake manifold, whereby hydrogen and oxygen generated in said electrolysis chamber are withdrawn by the vacuum effect in said vacuum line and fed into said intake manifold; and
    a back pressure valve located in said hydrogen/oxygen delivery line between said electrolysis chamber and said intake manifold, for preventing back pressure resulting from engine backfire.

* * * * *

UNITED STATES PATENT AND TRADEMARK OFFICE
CERTIFICATE OF CORRECTION

PATENT NO. : 5,231,954
DATED : August 3, 1993
INVENTOR(S) : Gene B. Stowe

It is certified that error appears in the above-identified patent and that said Letters Patent is hereby corrected as shown below:

In Claim 1, line 47, column 9, the word "to" is changed to --top--.

In Claim 1, line 47, column 9, a comma is added after the word "cap".

In Claim 1, line 48, column 9, the comma is deleted after the word "being".

Signed and Sealed this

Fifth Day of April, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,231,954
DATED : August 3, 1993
INVENTOR(S) : Gene B. Stowe It is certified that error appears in the above-identified patent and that said Letters Patent is hereby corrected as shown below:

On the title page, item [56] References Cited - U.S. Patent Documents: the following U.S. references are added:

| | | | |
|---|---|---|---|
| 4,344,831 | 8/1982 | Weber | 123/DIG.12 |
| 4,409,931 | 10/1983 | Lindberg | 123/3 |
| 4,411,223 | 11/1983 | Kiely | 123/DIG.12 |
| 5,105,773 | 4/1992 | Cunningham | 123/DIG.12 |

Signed and Sealed this

Twentieth Day of September, 1994

Attest:

BRUCE LEHMAN

*Attesting Officer*  *Commissioner of Patents and Trademarks*